US012606121B2

(12) United States Patent
Qi et al.

(10) Patent No.: US 12,606,121 B2
(45) Date of Patent: Apr. 21, 2026

(54) IGNITION SYSTEM AND METHOD FOR MANUFACTURING THE SAME, GAS GENERATOR AND SAFETY AIRBAG

(71) Applicant: Yanfeng International Automotive Technology Co., Ltd., Shanghai (CN)

(72) Inventors: Jiayang Qi, Shanghai (CN); Xinglun Ren, Shanghai (CN); Zhujun Sun, Shanghai (CN); Junjie Li, Shanghai (CN)

(73) Assignee: Yanfeng International Automotive Technology Co., Ltd., Beijing (CN)

( * ) Notice: Subject to any disclaimer, the term of this patent is extended or adjusted under 35 U.S.C. 154(b) by 0 days.

(21) Appl. No.: 18/861,253

(22) PCT Filed: Oct. 13, 2023

(86) PCT No.: PCT/CN2023/124543
§ 371 (c)(1),
(2) Date: Oct. 29, 2024

(87) PCT Pub. No.: WO2024/109384
PCT Pub. Date: May 30, 2024

(65) Prior Publication Data
US 2025/0282320 A1 Sep. 11, 2025

(30) Foreign Application Priority Data
Nov. 25, 2022 (CN) .......................... 202211489477.1

(51) Int. Cl.
B60R 21/272 (2006.01)
B60R 21/26 (2011.01)

(52) U.S. Cl.
CPC .. B60R 21/272 (2013.01); B60R 2021/26029 (2013.01)

(58) Field of Classification Search
CPC ......... B60R 2021/26029; B60R 21/272; F42B 3/045; F42B 3/10; F42B 3/11; F42B 3/26
See application file for complete search history.

(56) References Cited

U.S. PATENT DOCUMENTS 6,073,963 A * 6/2000 Hamilton ................ B60R 21/26
280/741
6,341,562 B1 * 1/2002 Brisighella ............. B60R 21/26
102/202
(Continued)

FOREIGN PATENT DOCUMENTS

CN 1395503 A 2/2003
CN 104567555 A 4/2015
(Continued)

OTHER PUBLICATIONS

Machine translation of JP2004217059A, JP, Kato et al., published Aug. 5, 2004, translation obtained Oct. 9, 2025. (Year: 2025).*
(Continued)

*Primary Examiner* — Laura Freedman
(74) *Attorney, Agent, or Firm* — Cooley LLP

(57) ABSTRACT

An ignition system (10) for a gas generator comprises an ignition tube (1); a base (2) having a receptacle (23), wherein the ignition tube (1) is press-fitted into the receptacle (23) and extends out of the base (2) with its head (11), and the base (2) is configured as an integral injection-molded part, wherein a metal inlay (4) is injection-molded into a plastic material, and the inlay (4) provides a portion of the receptacle (23); and a container (3) having an opening (33), through which the base (2) together with the ignition tube (1) is press-fitted into the container (3), with the head (11) of the ignition tube (1) facing forward.

18 Claims, 6 Drawing Sheets

(56) References Cited

U.S. PATENT DOCUMENTS

| | | | |
|---|---|---|---|
| 6,454,306 B1 | 9/2002 | Cunningham et al. | |
| 6,820,556 B1 * | 11/2004 | Oda | F42B 3/195 |
| | | | 102/202.7 |
| 7,125,041 B2 * | 10/2006 | Kato | B60R 22/4628 |
| | | | 280/736 |
| 7,185,588 B2 * | 3/2007 | Clark | B60R 21/2644 |
| | | | 114/238 |
| 7,284,488 B2 * | 10/2007 | Maruyama | F42B 3/127 |
| | | | 102/202.14 |
| 7,614,875 B2 * | 11/2009 | Katsuda | B60R 21/26 |
| | | | 280/741 |
| 8,434,413 B2 * | 5/2013 | Mitsunabe | F42B 3/103 |
| | | | 102/202.14 |
| 8,459,694 B2 * | 6/2013 | Chen | B60R 21/272 |
| | | | 280/741 |
| 8,573,130 B2 * | 11/2013 | Chen | B60R 21/272 |
| | | | 280/736 |
| 9,139,156 B2 * | 9/2015 | Bierwirth | B01D 39/12 |
| 9,199,603 B2 * | 12/2015 | Ohsugi | B60R 21/264 |
| 9,944,249 B2 * | 4/2018 | Okuyama | B60R 21/264 |
| 9,945,645 B2 * | 4/2018 | Yamauchi | F42B 3/121 |
| 10,196,030 B2 * | 2/2019 | Imoto | B60R 21/264 |
| 10,676,061 B2 * | 6/2020 | Tanaka | F42B 3/12 |
| 11,084,453 B2 * | 8/2021 | Weber | F42B 3/26 |
| 11,084,454 B2 * | 8/2021 | Knollhuber | F42B 3/107 |
| 11,685,335 B2 * | 6/2023 | Noda | B60R 21/2644 |
| | | | 280/741 |
| 11,958,432 B2 * | 4/2024 | Hirano | B60R 21/2644 |
| 11,993,222 B2 * | 5/2024 | Mitsunabe | B60R 21/2644 |
| 2002/0189487 A1 | 12/2002 | Kubo et al. | |
| 2004/0251667 A1 * | 12/2004 | Harada | F42B 3/107 |
| | | | 280/736 |
| 2011/0265678 A1 * | 11/2011 | Sasamoto | B60R 21/2644 |
| | | | 102/530 |
| 2015/0107477 A1 | 4/2015 | Heigl et al. | |
| 2015/0171541 A1 | 6/2015 | Isenmann et al. | |
| 2016/0167618 A1 | 6/2016 | Jordan et al. | |
| 2018/0154859 A1 * | 6/2018 | Kubo | B60R 21/2644 |
| 2023/0015275 A1 | 1/2023 | Weber | |

FOREIGN PATENT DOCUMENTS

| | | | | |
|---|---|---|---|---|
| CN | 104713425 A | 6/2015 | | |
| CN | 110228440 A | 9/2019 | | |
| CN | 107000670 B | 7/2020 | | |
| CN | 111565980 A | 8/2020 | | |
| CN | 114901523 A | 8/2022 | | |
| CN | 115782806 A | 3/2023 | | |
| JP | 2004217059 A | * | 8/2004 | B60R 22/4628 |
| JP | 2021062814 A | 4/2021 | | |
| WO | WO-2019094185 A1 | 5/2019 | | |
| WO | WO-2020025301 A1 | 2/2020 | | |
| WO | WO-2024109384 A1 | 5/2024 | | |

OTHER PUBLICATIONS

International Search Report and Written Opinion for PCT Application No. PCT/CN2023/124543, by Yanfeng International Automotive Technology Co., Ltd., mailed Jan. 16, 2024; 16 pages (with English Translation).

First Examination Opinion and Search Report for Chinese Application No. CN2022114894771 mailed Jun. 27, 2025; 18 pages (with English Translation).

* cited by examiner

IGNITION SYSTEM AND METHOD FOR MANUFACTURING THE SAME, GAS GENERATOR AND SAFETY AIRBAG

RELATED APPLICATIONS

This application is a national stage of International Application No. PCT/CN2023/124543, filed Oct. 13, 2023, which claims priority to Chinese patent Application No. 202211489477.1, filed Nov. 25, 2022. Both of the aforementioned applications are hereby incorporated by reference in their entireties.

TECHNICAL FIELD

The present application relates to an ignition system for a gas generator, and a method for manufacturing the same, as well as a gas generator comprising the same, and a safety airbag comprising the gas generator.

BACKGROUND OF INVENTION

Safety airbags are widely used as safety protection devices for occupants in transportation means, especially in land transportation means, in particular in motor vehicles. A safety airbag may comprise a folded cushion and a gas generator. In a predetermined operation condition of a transportation means, for example, in a collision event of a motor vehicle, a gas generator can be activated to generate gas rapidly, wherein the generated gas is filled into a cushion to inflate and pop up the folded cushion, wherein an occupant is buffered, wherein the head or other body parts of the occupant is prevented from colliding with a hard or sharp object. The gas generator may also be referred to as an inflator. The safety airbag may be, for example, a driver's safety airbag mounted in a steering wheel, a co-driver's safety airbag mounted in an instrument panel, a curtain-type safety airbag or the like.

In the vehicle technology, an inflatable restraint system, such as a safety airbag, has been developed as a supplement to a conventional safety belt restraint system. Typically, when a safety airbag is activated, an occupant in a vehicle can be protected in a way that the inflated cushion with elasticity absorbs the physical impact caused by collision of the vehicle, wherein in the collision event, the cushion is inflated and enters a space between the occupant and an internal object or an internal surface of the vehicle, wherein the inflated cushion buffers the occupant, thereby reducing the possibility of injury to the occupant due to the unexpected contact of the occupant with the internal object or the internal surface of the vehicle.

A safety airbag may be a part of a safety protection system comprising a plurality of structural assemblies in a vehicle. Typically, these structural assemblies may relate to a cushion, a gas generator, a sensor and an electronic control unit. The sensor can acquire data related to an emergency state of the vehicle. The electronic control unit can process the data, and thus can determine whether a collision is about to occur or is occurring. With a trigger signal being input to the gas generator, the gas generator can be powered on and activated and thus can supply or generate gas.

A gas generator is known in practice, wherein a chamber surrounding an ignition tube is sealed with a rupture membrane. When the ignition tube is activated, a shock wave is generated by the ignition tube and breaks the rupture membrane. Typically, the rupture membrane needs to be mounted by welding, in order to hermetically close a container of the ignition system. Such a manufacturing process for the ignition system is costly.

In addition, a compression gas generator is known in practice, which may also be referred to as a "compression gas inflator". Such a gas generator comprises a pressure container, in which a pressure chamber for containing the compression gas is defined. When an ignition tube of the gas generator is activated, the ignition tube can ignite a pyrotechnic charge in a pyrotechnic charge chamber to generate a high-temperature and high-pressure gas instantaneously, which is mixed with the relatively cold compression gas to enhance the temperature and pressure of the compression gas, wherein the mixed gas is fed from the gas generator to a cushion through a diffuser. In such a gas generator known in the art, the ignition tube is provided with a base, wherein a machined metal body is adopted to ensure a support strength of the base; alternatively, a metal body is adopted as a base main body, and a coating plastic body is applied on the base main body to form an integral structural unit by the ignition tube and the base in an injection molding process, in order to ensure the support strength of the base. Such an ignition system has a large size, a heavy weight and high manufacturing costs. Relevant patent literatures in the prior art may be referred to CN107000670B and CN111565980A.

SUMMARY OF INVENTION

An object of the present application is to provide an ignition system for a gas generator, a method for manufacturing the ignition system, a gas generator comprising the ignition system, and a safety airbag comprising the gas generator, wherein the ignition system may have a compact size, is lightweight, and may advantageously reduce the manufacturing costs.

A first aspect of the invention relates to an ignition system for a gas generator, which comprises an ignition tube, a base and a container. The base has a receptacle, wherein the ignition tube is press-fitted into the receptacle and extends out of the base, wherein the base is configured as an integral injection-molded part, wherein a metal inlay is injection-molded into a plastic material, and the inlay provides a portion of the receptacle. The container has an opening, through which the base together with the ignition tube is press-fitted into the container, with a head of the ignition tube facing forward.

Through the technical measures of the present invention, an improved gas generator, for example a hybrid gas generator, can be achieved. On one hand, disadvantages related to a welding process of a rupture membrane on a container in a manufacturing process of an ignition system in the prior art can be avoided. On the other hand, in comparison with the prior art in which a metal body is used as the base simply, or a metal body is used as a base main body and is coated with a plastic body thereon, the present invention can meet the requirements for overall lightweight of the ignition system, simplify the manufacturing process, and achieve a compact size, wherein the base may have a flexible mounting interface conveniently adapted to ignition tubes in different sizes and types.

In some embodiments, the inlay may be configured as a metal disc or comprise a metal disc, wherein the disc has a central receiving hole which provides the portion of the receptacle.

In some embodiments, the receiving hole may comprise a first cylindrical hole section adjacent to a first side of the disc, and a second tapered hole section adjacent to the first cylindrical hole section and widened towards a second side of the disc opposite to the first side, and the plastic material of the base defines a third cylindrical hole section adjacent to the second tapered hole section. The second tapered hole section may have the diameter of the first cylindrical hole section on one side thereof and the diameter of the third cylindrical hole section on the other side thereof.

In some embodiments, the inlay may have a structure for enhancing a bonding connection of the plastic material with the inlay.

In some embodiments, the structure may comprise a plurality of holes, such as blind holes or through holes, which are distributed around the central receiving hole, and/or a plurality of notches, which are distributed on an edge of the inlay.

In some embodiments, the structure may comprise a plurality of through holes, which are evenly distributed around the central receiving hole, and a plurality of notches, which are evenly distributed on the edge of the inlay, wherein in a circumferential direction with reference to an axis of the receiving hole, each of the plurality of notches is centrally arranged between respective two adjacent through holes of the plurality of through holes.

In some embodiments, the container may be necked at an opening side, so as to hold the base together with the ignition tube within the container.

In some embodiments, the base may comprise a first section, and a second section adjacent to the first section and having a reduced diameter in comparison with the first section, wherein the inlay is embedded in the plastic material of the first section.

In some embodiments, except for the metal disc, the remaining base is completely made of the plastic material.

In some embodiments, in addition to the metal disc, the inlay may further comprise a hollow cylindrical metal handle connected with the disc.

In some embodiments, in addition to the metal disc as the inlay, the base may further comprise an additional metal inlay separate from the metal disc.

In some embodiments, the base may comprise a first section, and a second section adjacent to the first section and having a reduced diameter in comparison with the first section, wherein the disc of the inlay is embedded in the plastic material of the first section, the handle of the inlay surrounds and defines the second section, wherein the plastic material is injection-molded on an inner peripheral surface of the handle of the inlay to form a cavity, wherein the plastic material in the first section and the plastic material in the second section of the base are integrally connected.

In some embodiments, the container may be necked at an opening side after the base together with the ignition tube is press-fitted into the container.

In some embodiments, the container may comprise a hollow body portion having the opening and a bottom opposite to the opening; and a hollow protrusion protruding from the bottom of the body portion.

In some embodiments, the base may be received in the body portion and is abutted against the bottom of the body portion, and the head of the ignition tube extending out of the base may be received in the protrusion, wherein a top end of the protrusion is configured to be opened by a shock wave generated by the ignition tube when the ignition system is activated.

In some embodiments, the protrusion may have a wall thickness, which is gradually decreased in a direction away from the body portion, and/or the protrusion is provided with a weakened notch at its top end. With the design of a gradually-varying wall thickness for the hollow protrusion of the container, and/or with a weakened design for a thin-wall area on the top end of the protrusion, the shock wave generated by the ignition tube, when the ignition tube is activated, can smoothly open the top end of the protrusion of the container, so as to reliably ignite the pyrotechnic charge contained in the pyrotechnic charge chamber.

In some embodiments, a ratio "a" of a minimum wall thickness to a maximum wall thickness of the protrusion can satisfy the formula $0.5<a<1$, and/or a ratio "b" of a height of the protrusion to an outer diameter of the head of the ignition tube can satisfy the formula $b\geq1$. Under the circumstance that the hollow protrusion of the container has the predetermined height, a reliable ignition channel can be provided to ensure the operation reliability of igniting the pyrotechnic charge in the pyrotechnic charge chamber of the gas generator, especially the hybrid gas generator.

In some embodiments, the ignition system may be a rotationally symmetric structural unit with a longitudinal axis.

In some embodiments, the base and/or the container and/or the ignition tube may be rotationally symmetric members with a longitudinal axis.

In some embodiments, the base comprises a front end surface and a rear end surface. Preferably, at least one, and particularly both, of the end surfaces is/are planar.

In some embodiments, the container may be internally provided, in a transition area from the body portion to the protrusion, with a slope adapted to the ignition tube, so as to provide a supporting and fixing interface for the ignition tube.

A second aspect of the invention relates to a gas generator, which comprises an ignition system according to any one of embodiments of the present invention, and a pyrotechnic charge chamber, wherein the ignition system and the pyrotechnic charge chamber are configured such that the ignition system, when activated, ignites a pyrotechnic charge contained in the pyrotechnic charge chamber.

In some embodiments, the gas generator may be a hybrid gas generator. The hybrid gas generator comprises a pressure container, in which a pressure chamber for containing the compression gas is defined, wherein the ignition system and the pyrotechnic charge chamber are configured such that the ignition system, when activated, ignites the pyrotechnic charge contained in the pyrotechnic charge chamber, wherein the gas generated by the combustion of the pyrotechnic charge can be mixed with the compression gas.

In some embodiments, the gas generator may be configured for a driver's safety airbag, a co-driver's safety airbag, a side air curtain, a seat safety airbag or any other safety airbag.

A third aspect of the invention relates to a method for manufacturing an ignition system, comprising the steps of:

providing an ignition tube;

providing a base having a receptacle and configured as an integral injection-molded part, wherein a metal inlay is injection-molded into a plastic material, and the inlay provides a portion of the receptacle;

providing a container having an opening;

press-fitting the ignition tube into the receptacle, wherein the ignition tube extends out of the base with a head of the ignition tube;

press-fitting the base together with the ignition tube into the container through the opening, with the head of the ignition tube facing forward.

In some embodiments, the method may further comprise necking the container at the opening side, after the base together with the ignition tube is press-fitted into the container.

A fourth aspect of the invention relates to a safety airbag, which comprises a cushion, in particular a folded cushion, and a gas generator according to any one of embodiments of the present invention, wherein the safety airbag is preferably a side air curtain.

A fifth aspect of the present invention relates to a transportation means, in particular a motor vehicle, comprising the safety airbag according to the fourth aspect of the invention.

The technical features mentioned above, technical features to be mentioned below and technical features separately shown in the drawings can be arbitrarily combined with each other, only if the combined technical features are not contradictory. All the feasible combinations of the features belong to the technical contents clearly recited in the present application. Any one of the multiple sub-features contained in a single sentence can be applied independently, and need not to be applied together with the other sub-features.

BRIEF DESCRIPTION OF DRAWINGS

The present invention is described in more detail by means of exemplary embodiments with reference to the attached drawings. The figures are briefly described as follows.

EMBODIMENTS

Figures 1, 2:
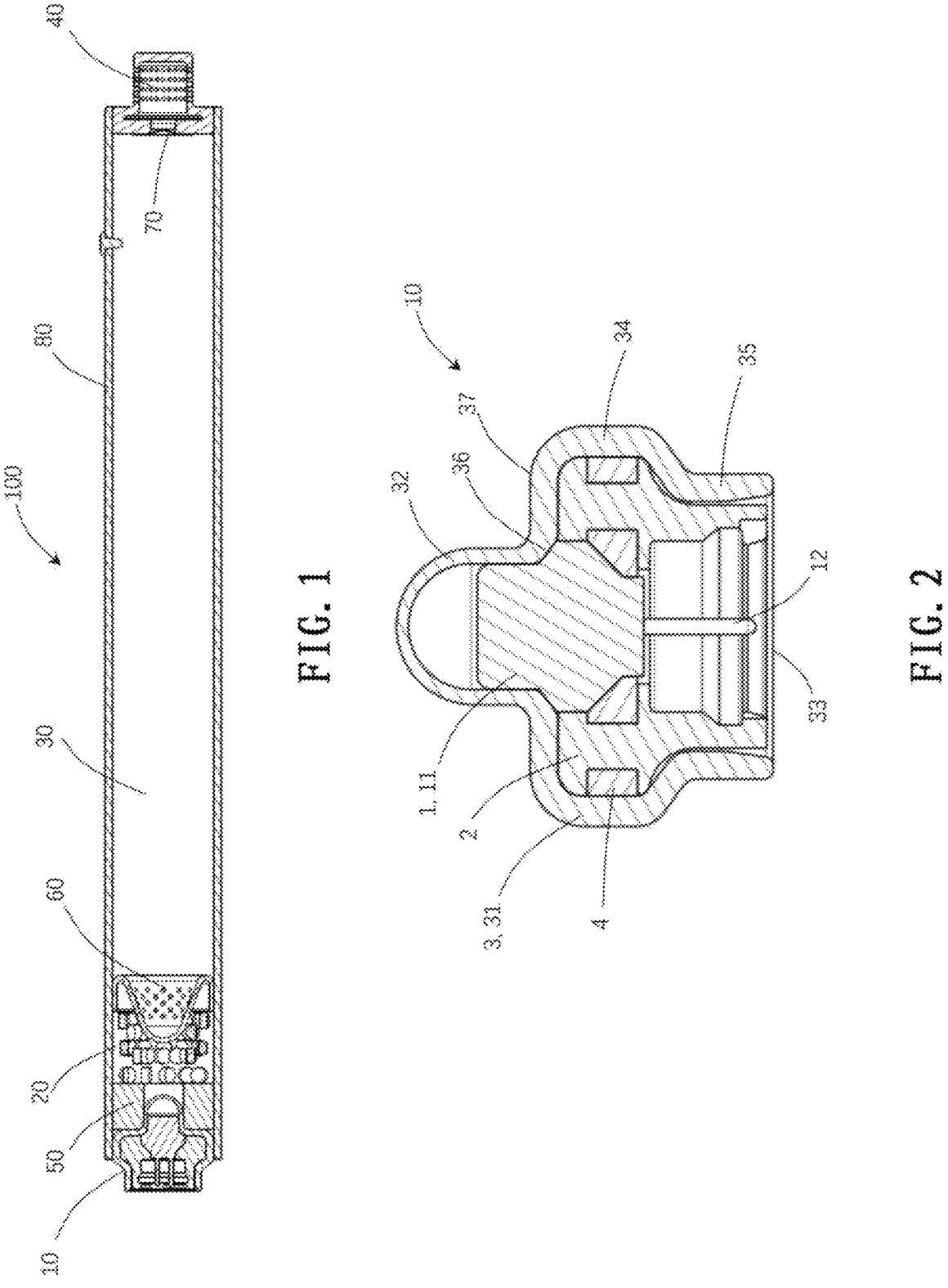
FIG. 1 is a schematic longitudinal sectional view of a gas generator according to an embodiment of the present invention.
FIG. 2 is a schematic longitudinal sectional view of an ignition system of the gas generator of FIG. 1.

Exemplary embodiments are now described more fully with reference to the attached drawings. It should be noted that elements that are not necessary for understanding the present invention may be omitted from the drawings for convenience of explanation and understanding. In the drawings, the same reference signs indicate the same components or components with the same function. In the following description, numerous specific details are set forth, such as examples of specific components, devices and methods, in order to provide a thorough understanding of embodiments of the disclosure. It will be apparent to those skilled in the art that it is not necessary to adopt all these specific details. The exemplary embodiments should not be understood as restrictive ones.

FIG. 1 is a schematic longitudinal sectional view of a gas generator 100 according to an embodiment of the present invention. The gas generator 100 may be configured as a hybrid gas generator. Although the present invention is introduced in particular with reference to a hybrid gas generator hereafter, those skilled in the art can, under the teaching provided herein, appreciate and recognize that the present invention is not limited to the hybrid gas generator, and the gas generator 100 of the present invention can be applied generally to various types of safety airbags, such as a knee safety airbag, a distal airbag, a seat-side airbag and the like. Those skilled in the art can appreciate and recognize that the ignition system 10, the gas generator 100 comprising the ignition system 10, and the safety airbag comprising the gas generator 100 can be generally applied to transportation means, such as land transportation means, marine transportation means or airborne transportation means, and particularly motor vehicles. The motor vehicles may relate to passenger vehicles or trucks.

The gas generator 100 shown in FIG. 1 may comprise an elongated pressure container 80 that extends in a straight or curved line, such as a pressure container 80 in the shape of a hollow cylinder, in which a pressure chamber 30 for containing the compression gas is formed. The compression gas may typically be an inert gas. The pressure container 80 may be constructed as a tubular member, which may have a circular or non-circular cross section. The pressure container 80 is provided with an ignition system 10 and a pyrotechnic charge chamber 20 at its first axial end, and with a diffuser 40 at its second axial end opposite to the first axial end. The pressure chamber 30 is hermetically closed by the ignition system 10 at the first axial end, and is hermetically closed by the diffuser 40 at the second axial end. The ignition system 10 is, as a structural unit, fixed to the first axial end of the pressure container 80. For example, it's hermetically connected with an inner wall of the pressure container 80 by welding. The pyrotechnic charge chamber 20 is defined by a first partition element 50 and a second partition element 60, and is filled with a pyrotechnic charge in the form of block, sheet, ball or any other suitable forms. The first partition element 50 is abutted against the ignition system 10, and has a central hole, into which a protrusion 32 of the ignition system 10 extends. The second partition element 60 may have a plurality of small holes, which shall be sized to ensure that the pyrotechnic charge can't pass from the pyrotechnic charge chamber 20 through these small holes into the pressure chamber 30 containing the compressed air. The diffuser 40 may be sealed with a rupture membrane 70 on its end surface facing the pressure container 80.

When the ignition system 10 is activated, the pyrotechnic charge contained in the pyrotechnic charge chamber 20 is ignited by the ignition system 10, wherein a hot gas with a high temperature and a high pressure is generated by combustion of the pyrotechnic charge. The hot gas enters the pressure chamber 30 through the small holes in the second partition element 60, and is mixed with the cold compression gas to enhance the temperature and pressure of the cold compression gas. Accordingly, the rupture membrane 70 on the diffuser 40 is broken under the action of a shock wave and/or the pressure, and then the mixed gas is output to a folded cushion (not shown) of the safety airbag through the diffuser 40, inflates the cushion, and thereby a predetermined safety protection function is provided.

In the embodiment shown in FIG. 1, the ignition system 10 is applied to a hybrid gas generator. It can be understood that the ignition system 10 is not limited to be applied in a hybrid gas generator, but can be applied to various types of gas generators.

The ignition system 10 for the gas generator 100 and components of the ignition system 10 are now described in more detail with reference to FIG. 2, FIGS. 3A to 3D and FIGS. 4A to 4C.

The ignition system 10 comprises an ignition tube 1, a base 2 and a container 3. The ignition tube 1 itself is known in practice and may be a standardized product. The ignition tube 1 may also be referred to as a detonator or a detonator assembly. The ignition tube 1 may contain reactive fillers. When an electrically conductive lead wire 12 of the ignition tube 1 is powered on, and then chemical reaction occurs to the reactive fillers rapidly, wherein a shock wave is generated to open a top end of the container 3, and thus the pyrotechnic charge in the pyrotechnic charge chamber 20 is ignited to fulfill the detonation function.

The base 2 is configured as an integral injection-molded part, wherein a metal inlay 4 is injection-molded into a plastic material. The plastic material may be a thermoplastic or thermosetting plastic. The plastic material may be a single plastic or a combination of multiple plastics. The plastic material may contain reinforcing fibers, such as glass fibers or carbon fibers. The plastic material may be an elastomeric plastic or a plastic with substantially no elasticity. Exemplary plastic materials may be F30, F40, PA, PC, PVC and PPR. The metal material for the inlay 4 may be, for example, carbon steel and stainless steel. The material for the container 3 may be the same as or different from the plastic material for the base 2, for example, may be glass fiber- or carbon fiber-reinforced plastic.

Figure 3A:
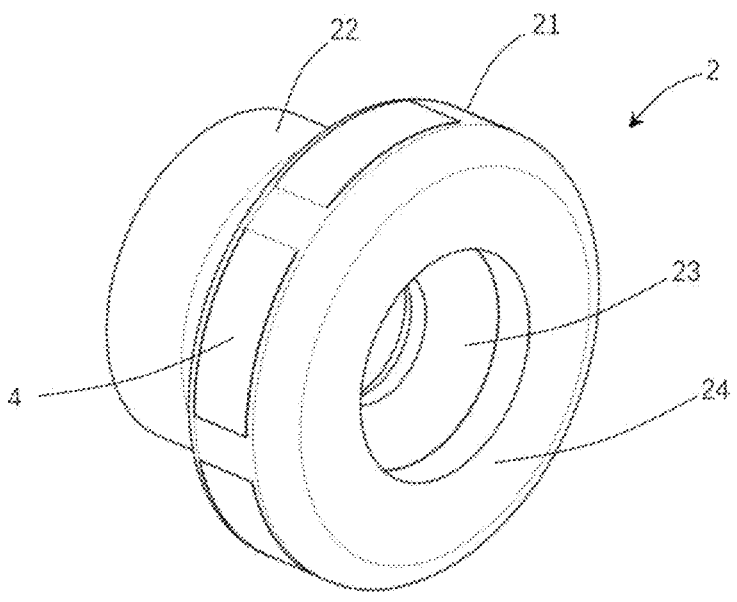
FIGS. 3A and 3B are a perspective view and a longitudinal sectional view of a base of the ignition system of FIG. 2.
Figure 3B:
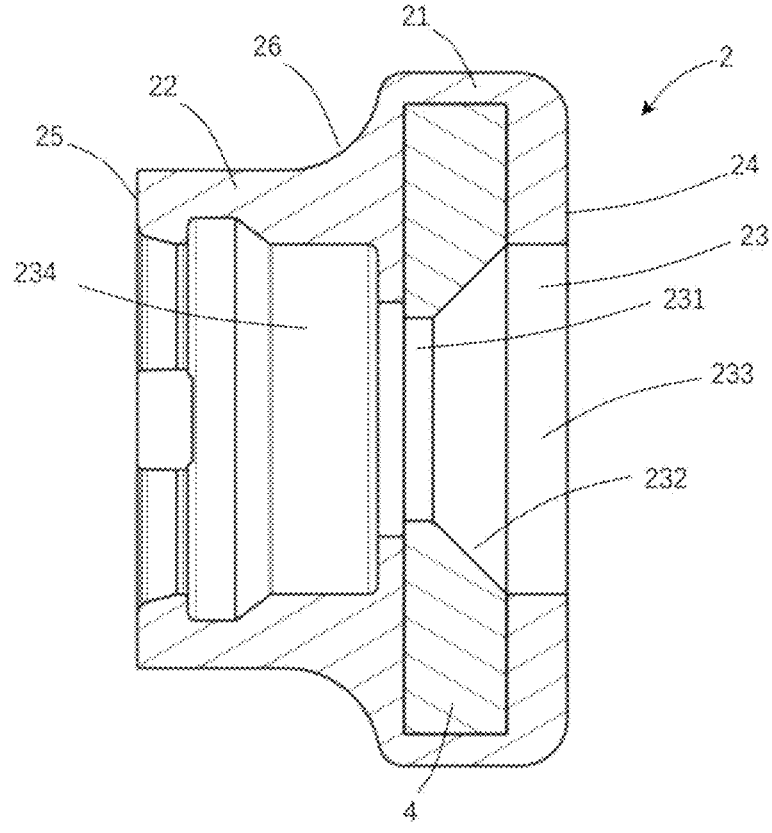

As shown in FIGS. 3A and 3B, the base 2 comprises a first section 21 with a larger diameter, and a second section 22 adjacent to the first section 21 and having a reduced diameter in comparison with the first section 21. The inlay 4 is embedded in the plastic material of the first section 21. The first section 21 and the second section 22 may have an arc-shaped transition 26 therebetween. The base 2 has a front end surface 24 and a rear end surface 25. The base 2 has a receptacle 23 open to the front end surface 24. The ignition tube 1 can be press-fitted into the receptacle 23 of the base 2. In a state where the ignition tube 1 and the base 2 are assembled, the ignition tube 1 extends out of the front end surface 24 of the base 2.

Figure 3C:
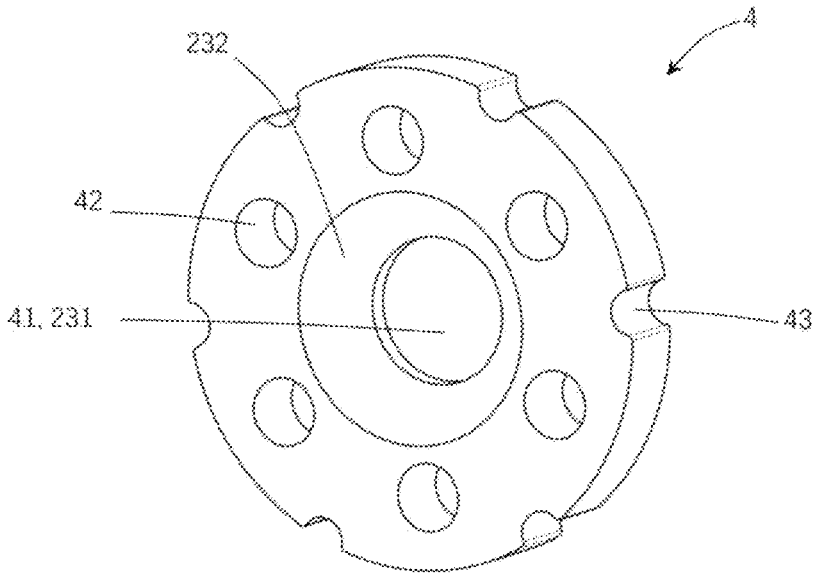
FIG. 3C is a perspective view of a metal inlay of the base of FIGS. 3A and 3B.

The receptacle 23 of the base 2 comprises a plurality of hole sections 231, 232 and 233. As shown in FIGS. 3B and 3C, the inlay 4 may be constructed as a metal disc. The inlay 4 has a central receiving hole 41. The receiving hole 41 comprises a first cylindrical hole section 231 adjacent to a first side of the inlay 4, and a second tapered hole section 232 adjacent to the first cylindrical hole section 231 and widened towards a second side of the inlay 4 opposite to the first side. The inlay 4 provides the two hole sections 231, 232 of the receptacle 23 of the base 2. The plastic material of the first section 21 of the base 2 defines a third cylindrical hole section 233 adjacent to the second tapered hole section 232, wherein the third cylindrical hole section is a portion of the receptacle 23. The plastic material of the base 2 in the second section 22 defines a recess 234, into which the lead wire 12 of the ignition tube 1 extends. Advantageously, the base 2 may be a rotationally symmetrical body.

In order to enhance a bonding strength between the plastic material and the metal inlay 4 of the base 2, the inlay 4 may have a structure. The structure may be a protrusion such as a pillar, a bump, a pyramid or the like, which extends from the surface of the inlay. Alternatively or additionally, the structure may be a recess, such as a through hole, a blind hole, a notch or the like. In the exemplary embodiment shown in FIG. 3C, the structure comprises six through holes 42, which are evenly distributed around the receiving hole 41, and six notches 43, which are evenly distributed on an edge of the inlay 4, wherein in a circumferential direction with reference to an axis of the receiving hole 41 of the inlay 4, each of the six notches 43 is centrally arranged between respective two adjacent through holes of the six through holes 42, with an angular distance of 60° between two adjacent through holes 42, with an angular distance of 60° between two adjacent notches 43, and with an angular distance of 30° between each notch 43 and any adjacent through hole 42.

Figure 3D:
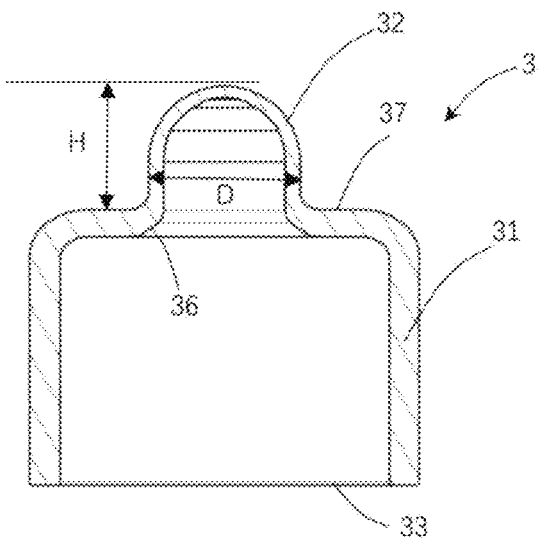
FIG. 3D is a schematic longitudinal sectional view of a container before being assembled.

As shown in FIG. 2 and FIG. 3D, the container 3 comprises a hollow body portion 31, which has an opening 33 and a bottom 37 opposite to the opening 33. The container 3 further comprises a hollow protrusion 32 protruding from the bottom 37 of the body portion 31. The protrusion 32 may comprise a short hollow cylindrical portion and a hollow hemispherical portion. As shown in FIG. 3D, the body portion 31 of the container 3 is cylindrical before being assembled. During assembly, the base 2 together with the ignition tube 1, is press-fitted into the container 3 through the opening 33, with a head 11 of the ignition tube 1 facing forward (i.e., facing the container).

As shown in FIG. 2, after being assembled, the container 3 is necked at an axial section adjacent to the opening 33, thus forming a first section 34 with a larger diameter and a second section 35 with a reduced diameter. With necking of the container 3, the base 2 together with the ignition tube 1 is firmly held in the container 3. Even when the ignition system 10 is activated, the base 2 together with the ignition tube 1 isn't detachable from the container 3 through the opening 33 of the container 3.

In an assembled state of the ignition system 10, the base 2 is received in the body portion 31 and is abutted against the bottom 37 of the body portion 31, and the head 11 of the ignition tube 1 extending out of the base 2 is received in the protrusion 32. A top end of the protrusion 32 is configured to be openable by a shock wave generated by the ignition tube 1 when the ignition system 10 is activated. The first section 34 of the body portion 31 of the container 3 surrounds the first section 21 of the base 2, and the second section 35 of the body portion 31 of the container 3 surrounds the second section 22 of the base 2. The container 3 may be internally provided, in a transition area from the body portion 31 to the protrusion 32, with a slope 36 adapted to the ignition tube 1, so as to provide a supporting and fixing interface for the ignition tube 1.

Advantageously, the protrusion 32 has a wall thickness, which is gradually decreased in a direction away from the body portion 31, and thus has a minimum wall thickness at the top end and a maximum wall thickness at the root adjacent to the bottom 37 of the body portion 31. Advantageously, a ratio "a" of a minimum wall thickness to a maximum wall thickness of the protrusion 32 may satisfy the formula: $0.5<a<1$. Furthermore, it is advantageous that a ratio "b" of a height H of the protrusion to an outer diameter D of the head 11 of the ignition tube 1 may satisfy the formula: $b≥1$.

Figures 4A, 4B, 4C:
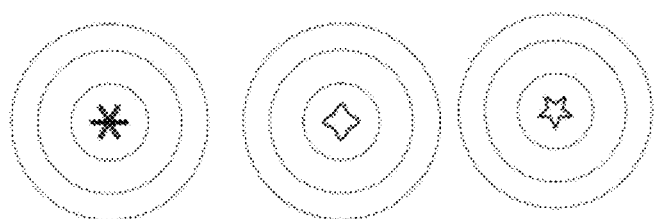
FIGS. 4A to 4C are schematic top views of a protrusion of the container of FIG. 3D.

The protrusion 32 may have a weakened notch at its top end or not. The weakened notch may be in the form of a straight line, a cross, a plum blossom, a star or any other suitable form. FIGS. 4A-4C show three exemplary weakened notches. In the example shown in FIG. 4A, the top end of the protrusion 32 is provided with three intersecting notches in the form of straight lines. In the example shown in FIG. 4B, the top end of the protrusion 32 is provided with a notch in the form of a plum blossom. In the example shown in FIG. 4C, the top end of the protrusion 32 is provided with a notch in the form of a five-pointed star.

The container 3 may have a gradually varying wall thickness, wherein a larger wall thickness is adopted for the hollow body portion 31 so as to ensure, particularly well, the assembly of the container 3 with other components of the gas generator 100 and guarantee a sufficient fastening strength of the container 3 for the base at its opening side; and a gradually-decreasing wall thickness is adopted for the hollow protrusion 32, preferably the height H of the protrusion being greater than or equal to the outer diameter D of the head 11 of the ignition tube 1, so that the shock wave generated by the ignition tube 1 can open the closed top end of the protrusion 32 timely when the ignition tube 1 is activated.

Figure 5A:
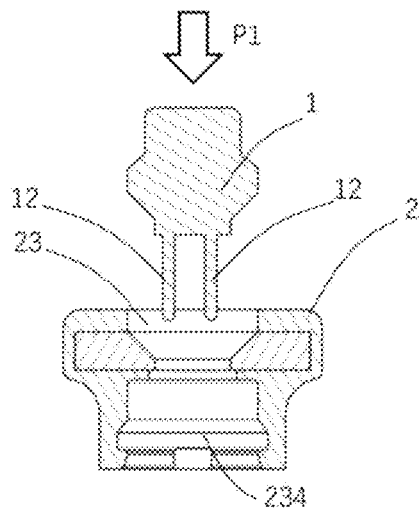
FIGS. 5A to 5C are schematic views showing steps for manufacturing the ignition system of FIG. 2.
Figure 5B:
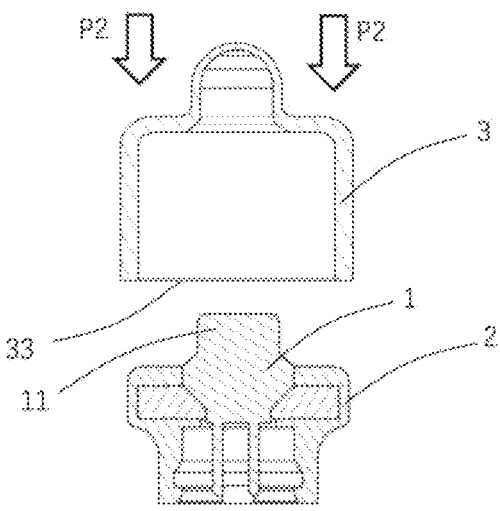
Figure 5C:
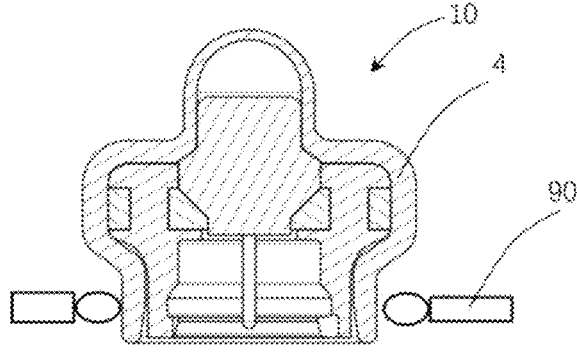

FIGS. 5A to 5C are schematic views showing various steps for manufacturing the ignition system 100 shown in FIG. 2.

As shown in FIG. 5A, after the ignition tube 1 and the base 2 are provided, the ignition tube 1 is press-fitted into the receptacle 23 of the base 2, as schematically indicated by the arrow P1. The ignition tube 1 and the receptacle 23 of the base 2 have complementary shapes, wherein the ignition tube 1 is firmly held in the receptacle 23 of the base 2 in an interference-fitting manner, and the two electrically-conductive lead wires 12 of the ignition tube 1 extend into the recess 234 at the rear side of the base 2. Upon press-fitting, the base 2 may be kept still, while the ignition tube 1 is moved; or the ignition tube 1 is kept still, while the base 2 is moved; or not only the base 2 but also the ignition tube 1 are moved.

As shown in FIG. 5B, after the base 2 is assembled with the ignition tube 1, the container 3 is provided, and the base 2 together with the ignition tube 1 is press-fitted, with the head 11 of the ignition tube 1 facing forward, into the container 3 through the opening 33 of the container 3, as schematically indicated by two arrows P2. Upon press-fitting, the assembled base 2 and ignition tube 1 may be kept still, while the container 3 is moved; or the container 3 is kept still, while the assembled base 2 and ignition tube 1 are moved; or not only the assembled base 2 and ignition tube 1, but also the container 3 are moved.

As shown in FIG. 5C, after the assembled base 2 and ignition tube 1 are press-fitted into the container 3, the container 3 is necked at the opening side. The necking step may be realized, for example, by a riveting device 90 schematically illustrated. As an alternative or supplement, the necking may be realized by an extrusion tool.

Now, a base 2 according to another embodiment is described with reference to FIGS. 6C to 6C. The base 2 may be assembled with an ignition tube 1 and a container 3, which may be constructed in a way same as or similar to those in the ignition system 10 shown in FIG. 2, to form an ignition system according to another embodiment, wherein the assembling method may be carried out in the same or similar way as that shown in FIGS. 5A to 5C. The base 2 is configured as an integral injection-molded part, in which a metal inlay 4 is injection-molded into a plastic material.

Figure 6A:
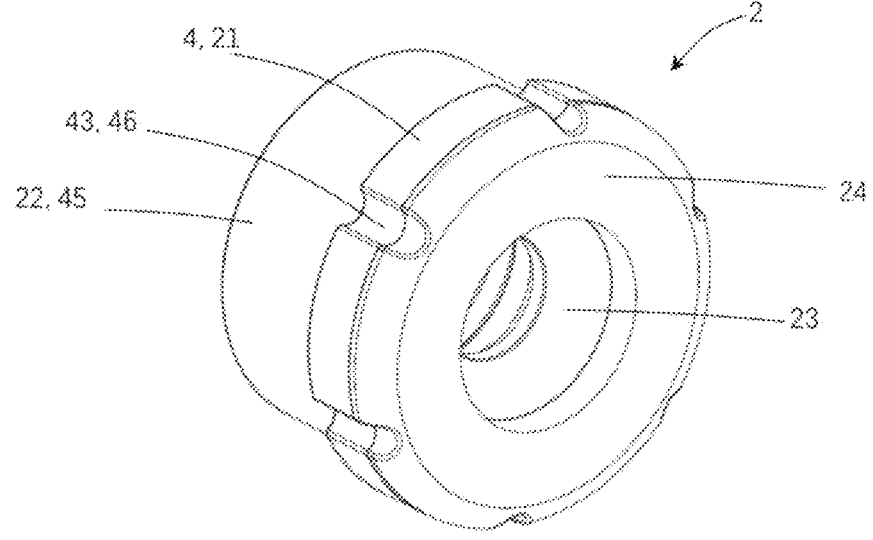
FIGS. 6A and 6B are a perspective view and a longitudinal sectional view of a base according to another embodiment.
Figure 6B:
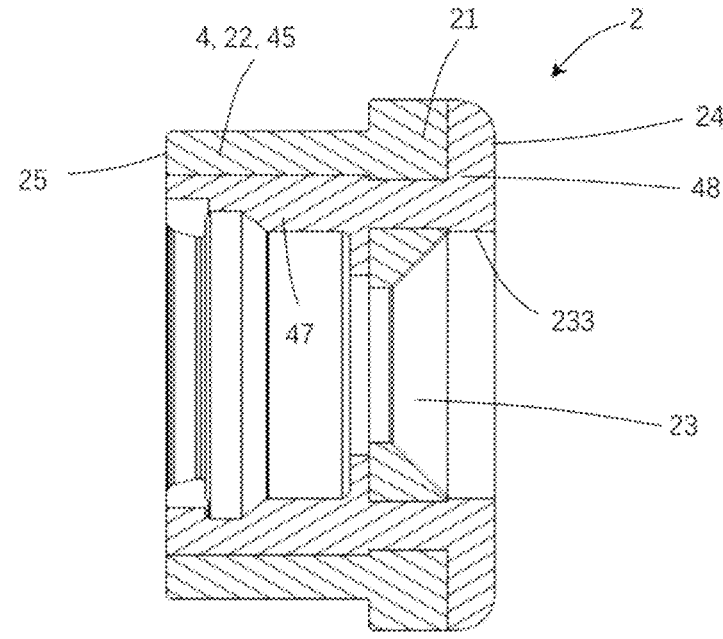
Figure 6C:
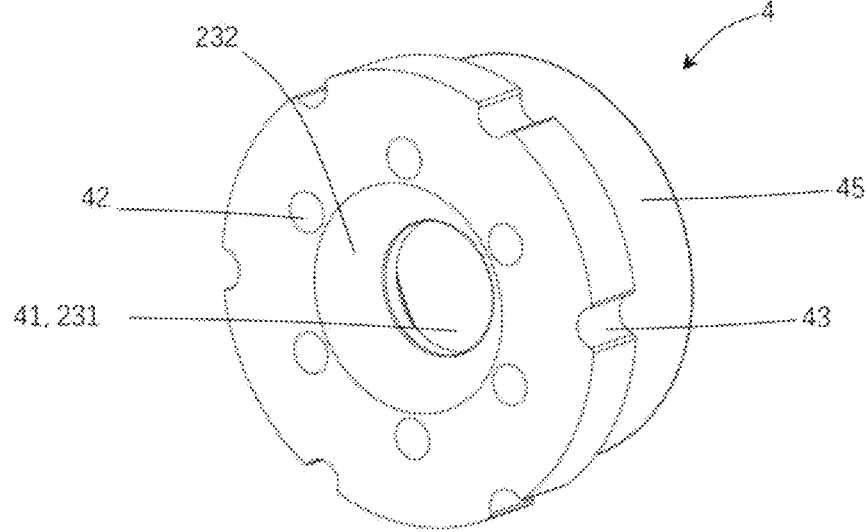
FIG. 6C is a perspective view of a metal inlay of the base of FIGS. 6A and 6B.

As shown in FIG. 6C, the metal inlay 4 comprises a metal disc, and a hollow cylindrical metal handle 45 connected, especially integrally connected, to the disc. Here, the disc may be constructed in a way same as or similar to that shown in FIG. 3C.

As shown in FIGS. 6A and 6B, the base 2 comprises a first section 21 with a larger diameter, and a second section 22 adjacent to the first section 21 and having a reduced diameter in comparison with the first section 21. The metal disc of the inlay 4 is embedded in the first plastic material 48 of the first section 21, the handle 45 of the inlay 4 surrounds and defines the second section 22, the second plastic material 47 is injection-molded on an inner peripheral surface of the handle 45 of the inlay 4 and thus forms a cavity, wherein the first plastic material 48 in the first section and the second plastic material 47 in the second section of the base 2 are integrally connected.

Same as or Similar to the previous embodiment, the base 2 has a front end surface 24 and a rear end surface 25. The base 2 has a receptacle 23 open to the front end surface 24. An ignition tube (not shown) can be press-fitted into the receptacle 23 of the base 2. The front end surface 24 of the base 2 is provided by the first plastic material 48. The rear end surface 25 of the base 2 is provided jointly by the handle 45 of the metal inlay 4 and the second plastic material 47.

As shown in FIGS. 6A and 6B, the through holes 42 in the disc of the inlay 4 are filled with the plastic material during injection molding, so that the injection molded material and the metal inlay are firmly connected together. Unlike the embodiment shown in FIGS. 3A and 3B, here, the notches 43 on the edge of the disc of the inlay 4 are not used for the interconnection between the injection molded material and the metal inlay. Instead, the notches 43 together with the corresponding notches in the first plastic material 48 form notches 46 running through the entire axial length of the first section.

The base 2 as shown in FIGS. 6A and 6B can be assembled with the container 3 by rotary riveting particularly well. The base 2 may have improved overall strength, and thus have the advantages of light weight and high strength.

It should be noted that within the scope of the present application, the cylindrical shape may preferably be a circular cylindrical shape or a substantially circular cylindrical shape. It may be appreciated that other cylindrical shapes or approximately cylindrical shapes that deviate from the circular cylindrical shape may also be taken into consideration.

It should be noted that the terminology used here is only for the purpose of describing specific aspects, and is not used to limit the disclosure. As used herein, the singular forms "a" and "the" shall comprise the plural forms, unless otherwise explicitly indicated. It can be understood that the terms "comprising" and "including" and other similar terms, when used in the application document, specify the existence of stated operations, elements and/or components, but do not exclude the existence or addition of one or more other operations, elements, components and/or their combinations. The term "and/or" as used herein comprises all arbitrary combinations of one or more related listed items. In the description of the drawings, like reference signs always indicate like elements.

The thickness of elements in the drawings may be exaggerated for clarity. In addition, it can be appreciated that if an element is referred to be on, coupled with or connected with another element, it can be directly formed on, coupled with or connected with the other element, or there may be one or more intervening elements between them. On the contrary, if the expressions "directly on . . . ", "directly coupled with . . . " and "directly connected with . . . " are used here, it means that there are no intervening elements. Other wordings such as "between . . . " and "directly between . . . ", "attached" and "directly attached", "adjacent"

and "directly adjacent" and so on used to describe the relationship between elements should be interpreted in a similar way.

Terms such as "top", "bottom", "above", "below", "upper" and "lower" are used here to describe the relationship of one element, layer or region with respect to another element, layer or region as shown in the drawings. It can be appreciated that these terms should also comprise other orientations of the device besides those depicted in the drawings.

It can be understood that although the terms "first", "second" and the like may be used herein to describe different elements, these elements shall not be limited by these terms. These terms are only used to distinguish one element from another. Therefore, a first element may be referred to as a second element without departing from the teaching of the present inventive concept.

It can also be contemplated that all the exemplary embodiments disclosed herein can be arbitrarily combined with each other. Finally, it should be pointed out that the above embodiments are only for understanding the present invention, and are not to limit the scope of protection of the present invention. For those skilled in the art, modifications can be made on the basis of the embodiments, which do not depart from the protection scope of the present invention.

The invention claimed is:

1. An ignition system for a gas generator, comprising an ignition tube, wherein the ignition system further comprises:
  a base having a receptacle, wherein the ignition tube is press-fitted into the receptacle and extends out of the base with its head, wherein the base is configured as an integral injection-molded part, wherein a metal inlay is injection-molded into a plastic material, wherein the inlay provides a portion of the receptacle; and
  a container having an opening, through which the base together with the ignition tube is press-fitted into the container, with the head of the ignition tube facing forward,
  the ignition system being a structural unit to be mounted to a housing of the gas generator,
  wherein the metal inlay is configured as a metal disc or comprises the metal disc, wherein the metal disc has a central receiving hole which provides the portion of the receptacle,
  wherein the central receiving hole comprises a first cylindrical hole section adjacent to a first side of the metal disc, and a second tapered hole section adjacent to the first cylindrical hole section and widened towards a second side of the metal disc opposite to the first side, and the plastic material of the base defines a third cylindrical hole section adjacent to the second tapered hole section.

2. The ignition system for the gas generator as recited in claim 1, wherein the metal disc has a structure for enhancing a bonding connection of the plastic material with the metal inlay.

3. The ignition system for the gas generator as recited in claim 2, wherein the structure comprises a plurality of through holes distributed around the central receiving hole, and/or a plurality of notches distributed on an edge of the metal inlay.

4. The ignition system for the gas generator as recited in claim 2, wherein the structure comprises a plurality of through holes, which are evenly distributed around the central receiving hole, and a plurality of notches, which are evenly distributed on an edge of the metal inlay, wherein in a circumferential direction with reference to an axis of the central receiving hole, each of the plurality of notches is centrally arranged between respective two adjacent through holes of the plurality of through holes.

5. The ignition system for the gas generator as recited in claim 1, wherein in addition to the metal disc, the metal inlay further comprises a hollow cylindrical metal handle connected with the metal disc.

6. The ignition system for the gas generator as recited in claim 5, wherein the base comprises a first section, and a second section adjacent to the first section and having a reduced diameter in comparison with the first section, wherein the metal disc of the metal inlay is embedded in the plastic material of the first section, the hollow cylindrical metal handle of the metal inlay surrounds and defines the second section, and the plastic material is injection-molded on an inner peripheral surface of the hollow cylindrical metal handle of the metal inlay and thus forms a cavity, wherein the plastic material in the first section and the plastic material in the second section of the base are integrally connected.

7. The ignition system for the gas generator as recited in claim 1, wherein the container is necked at the opening to hold the base together with the ignition tube within the container.

8. The ignition system for the gas generator as recited in claim 1, wherein the base comprises a first section, and a second section adjacent to the first section and having a reduced diameter in comparison with the first section, wherein the metal inlay is embedded in the plastic material of the first section, and the container is necked at the opening after the base together with the ignition tube is press-fitted into the container.

9. The ignition system for the gas generator as recited in claim 1, wherein the container comprises:
  a hollow body portion having the opening and a bottom opposite to the opening; and
  a hollow protrusion protruding from the bottom of the hollow body portion;
  wherein the base is received in the hollow body portion and is abutted against the bottom of the hollow body portion, wherein the head of the ignition tube extending out of the base is received in the hollow protrusion, and a top end of the hollow protrusion is configured to be opened by a shock wave generated by the ignition tube when the ignition system is activated.

10. The ignition system for the gas generator as recited in claim 9, wherein the hollow protrusion has a wall thickness, which is gradually decreased in a direction away from the hollow body portion, and/or the hollow protrusion has a weakened notch at its top end.

11. The ignition system for the gas generator as recited in claim 10, wherein a ratio "a" of a minimum wall thickness to a maximum wall thickness of the hollow protrusion satisfies the formula $0.5 < a < 1$, and/or a ratio "b" of a height of the hollow protrusion to an outer diameter of the head of the ignition tube satisfies the formula $b \geq 1$.

12. The ignition system for the gas generator as recited in claim 9, wherein the container is internally provided, in a transition area from the hollow body portion to the hollow protrusion, with a slope adapted to the ignition tube, so as to provide a supporting and fixing interface for the ignition tube.

13. A gas generator comprising an ignition system and a pyrotechnic charge chamber, wherein the ignition system and the pyrotechnic charge chamber are configured such that the ignition system, when activated, ignites a pyrotechnic charge contained in the pyrotechnic charge chamber, wherein the ignition system is the ignition system as recited in claim 1.

14. The gas generator as recited in claim 13, wherein the gas generator is a hybrid gas generator, wherein the hybrid gas generator comprises a pressure container in which a pressure chamber for containing a compression gas is defined, wherein the ignition system and the pyrotechnic charge chamber are configured such that the ignition system, when activated, ignites the pyrotechnic charge contained in the pyrotechnic charge chamber, and gas generated by combustion of the pyrotechnic charge is mixable with the compression gas.

15. A safety airbag comprising a cushion, and a gas generator in a fluid connection with the cushion, wherein the gas generator is the gas generator as recited in claim 13.

16. A method for manufacturing the ignition system as recited in claim 1, the method comprising:

providing the ignition tube;

providing the base having the receptacle and configured as the integral injection-molded part, wherein the metal inlay is injection-molded into the plastic material, wherein the metal inlay provides the portion of the receptacle, wherein the metal inlay is configured as the metal disc or comprises the metal disc, wherein the metal disc has the central receiving hole which provides the portion of the receptacle, wherein the central receiving hole comprises the first cylindrical hole section adjacent to the first side of the metal disc, and the second tapered hole section adjacent to the first cylindrical hole section and widened towards the second side of the metal disc opposite to the first side, and the plastic material of the base defines the third cylindrical hole section adjacent to the second tapered hole section;

providing the container having the opening;

press-fitting the ignition tube into the receptacle, wherein the ignition tube extends out of the base with its head; and press-fitting the base together with the ignition tube into the container through the opening, with the head of the ignition tube facing forward.

17. The method as recited in claim 16, wherein the base comprises a first section, and a second section adjacent to the first section and having a reduced diameter in comparison with the first section, the metal disc being embedded in a plastic material of the first section;

wherein the method comprises: necking the container at the opening side-after the base together with the ignition tube is press-fitted into the container.

18. An ignition system for a gas generator, comprising an ignition tube, wherein the ignition system further comprises:

a base having a receptacle, wherein the ignition tube is press-fitted into the receptacle and extends out of the base with its head, wherein the base is configured as an integral injection-molded part, wherein a metal inlay is injection-molded into a plastic material, wherein the metal inlay provides a portion of the receptacle; and a container having an opening, through which the base together with the ignition tube is press-fitted into the container, with the head of the ignition tube facing forward, the ignition system being a structural unit to be mounted to a housing of the gas generator, wherein the metal inlay is configured as a metal disc or comprises the metal disc, wherein the metal disc has a central receiving hole which provides the portion of the receptacle, wherein in addition to the metal disc, the metal inlay further comprises a hollow cylindrical metal handle connected with the metal disc, wherein the base comprises a first section, and a second section adjacent to the first section and having a reduced diameter in comparison with the first section, wherein the metal disc of the metal inlay is embedded in the plastic material of the first section, the hollow cylindrical metal handle of the metal inlay surrounds and defines the second section, and the plastic material is injection-molded on an inner peripheral surface of the hollow cylindrical metal handle of the metal inlay and thus forms a cavity, wherein the plastic material in the first section and the plastic material in the second section of the base are integrally connected.

* * * * *